Feb. 22, 1949.  W. W. BARNETT  2,462,711
FRONT WHEEL BICYCLE KNEE ACTION
Filed Aug. 2, 1946  2 Sheets-Sheet 1

INVENTOR.
WILLARD W. BARNETT
BY *Victor J. Evans & Co.*
ATTORNEYS

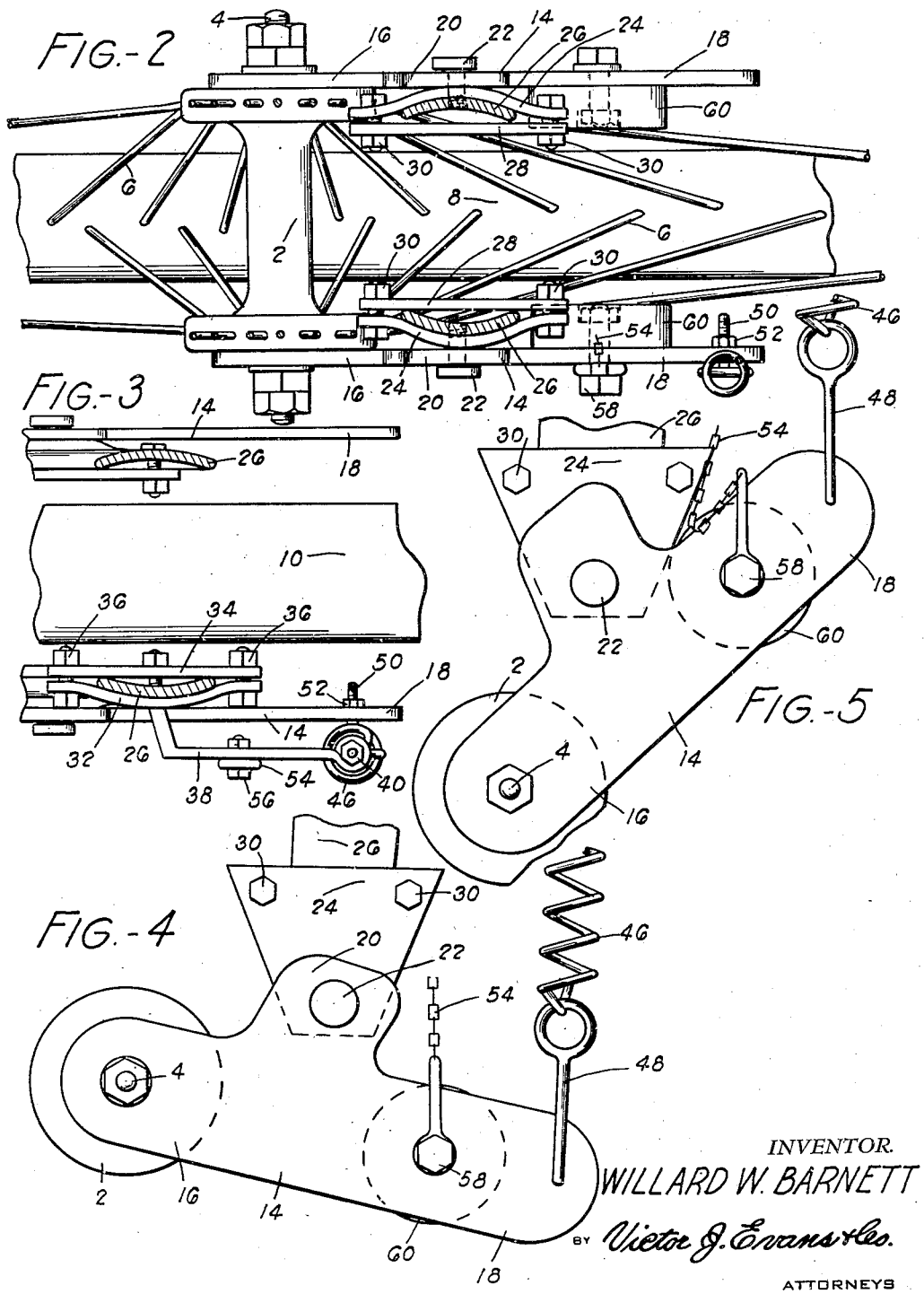

Patented Feb. 22, 1949

2,462,711

UNITED STATES PATENT OFFICE 2,462,711

FRONT WHEEL BICYCLE KNEE ACTION

Willard W. Barnett, Clovis, N. Mex.

Application August 2, 1946, Serial No. 687,854

1 Claim. (Cl. 280—277)

My present invention relates to an improved wheel suspension for bicycles and more particularly to a knee-action suspension for the front wheel of the bicycle to prevent damage such as buckling a common damage to bicycle forks, and to provide for resilient suspension of the front wheel with relation to the forks to make for easier riding.

In the accompanying drawings I have illustrated one complete example of the physical embodiment of my invention according to the best mode I have thus far devised but it will be understood that various changes and alterations may be made in the exemplified structure within the scope of the appended claim.

In the drawings:

Figure 2 is a horizontal sectional view thereof taken at line 2—2 of Figure 1.

Figure 3 is a horizontal sectional view taken at line 3—3 of Figure 1.

Figure 4 is a detail view of the suspension rocker in normal position; and

Figure 5 is a detail view of the rocker in tripped position as when the wheel has struck an obstacle.

Figure 1:
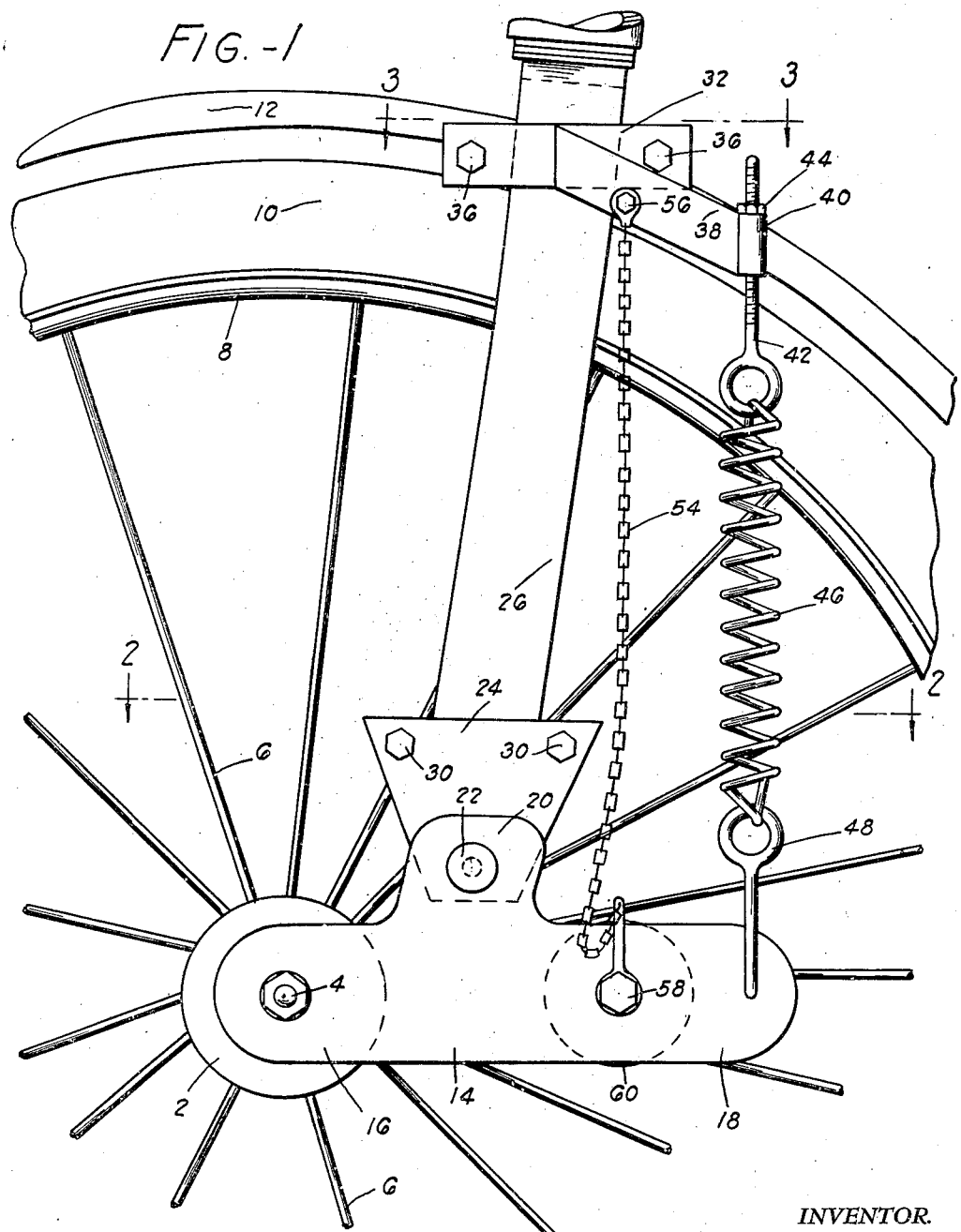
Figure 1 is a partial side elevational view of the front bicycle wheel embodying the suspension of my invention.

Referring now to the drawings in detail wherein like characters indicate like parts, I have illustrated the suspension means of my invention as mounted on a conventional bicycle front wheel including the hub 2 and the axle 4 securing the spokes 6 from the rim 8 upon which is mounted a tire 10. A fender or mudguard 12 is shown in position about the tire.

A rocker 14 having a forward portion 16 and a rearward portion 18 is fashioned with an upper extension 20 which is secured to the plate 24 in pivotal relation as by a rivet, and this plate is attached to the lower end of the conventional fork 26 by the bolts 30 connecting with the back or inner bar 28. The wheel axle is journaled in the forward portion of the rocker, one of which is mounted on each tine of the fork on either side of the wheel.

At the upper portion of the fork tines I utilize a support or hanger 32 having a securing bar 34 on the inner side of the fork tine and the hanger and bar are secured by bolts 36.

From this hanger an extension 38 extends diagonally downward and backward and the extension terminates in a channel 40 through which I provide an eye bolt 42 secured by nut 44 and the coil spring 46 is tensioned between the eyebolt 42 and an eye bolt 48 having an L-shaped leg 50 secured by nut 52 on the rear portion 18 of the rocker. Thus the weight of the bicycle and the rider is supported on the front portion of the rocker against the tension of the spring which tension may be adjusted by turning down the nut 44 on the eye bolt 42.

In order to limit the resilient movement of the rocker and the front wheel mounted thereon I employ a chain 54 secured on the hanger 32 by bolt 56 and this chain is attached to the rocker by bolt 58 which also retains on the inside of the rocker the thick soft rubber cushion 60. The chain will limit the downward movement of the rocker under the weight carried by the bicycle, and the cushion will abut the edge of the plate 24 when the wheel strikes an obstruction rocking the rocker and elevating the rear portion thereof and soften the blow as the upward movement ceases.

From the above description of the structure and operation of the suspension means of my invention it should be apparent that the knee-action will improve the riding quality of any conventional bicycle to which it may be attached, and damage to the forks will be avoided.

Having thus fully described my invention what I claim as new and desire to secure by Letters Patent is:

The combination with a bicycle fork for the front wheel, of a rocker, a plate journaling the rocker and detachably secured to the lower end of the fork, a wheel journaled on the forward portion of the rocker, a bracket detachably secured to the upper end of the fork, a coil spring interconnecting the rear portion of the rocker and the bracket, means for adjusting the tension of the spring, a chain for limiting the extended movement of the spring and a rubber cushion on the rear portion of the rocker positioned to abut the said plate and resiliently stop the upward movement of the rear portion of the rocker.

WILLARD W. BARNETT.

REFERENCES CITED

The following references are of record in the file of this patent:

UNITED STATES PATENTS

| Number | Name | Date |
|---|---|---|
| 1,000,115 | Oquist | Aug. 8, 1911 |
| 1,546,257 | Scarnecchia | July 14, 1925 |

FOREIGN PATENTS

| Number | Country | Date |
|---|---|---|
| 5,197 | Great Britain | Mar. 3, 1906 |